UNITED STATES PATENT OFFICE.

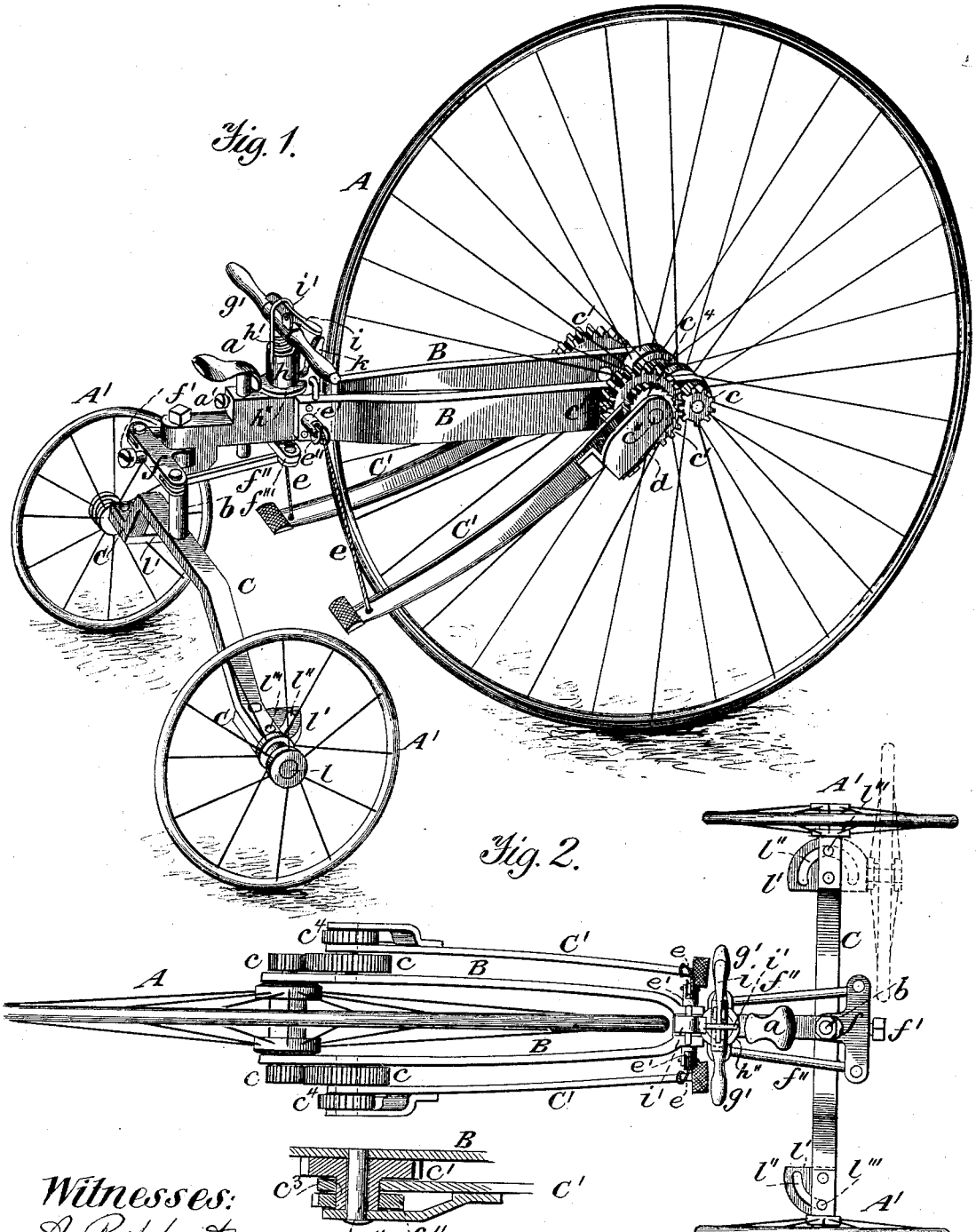

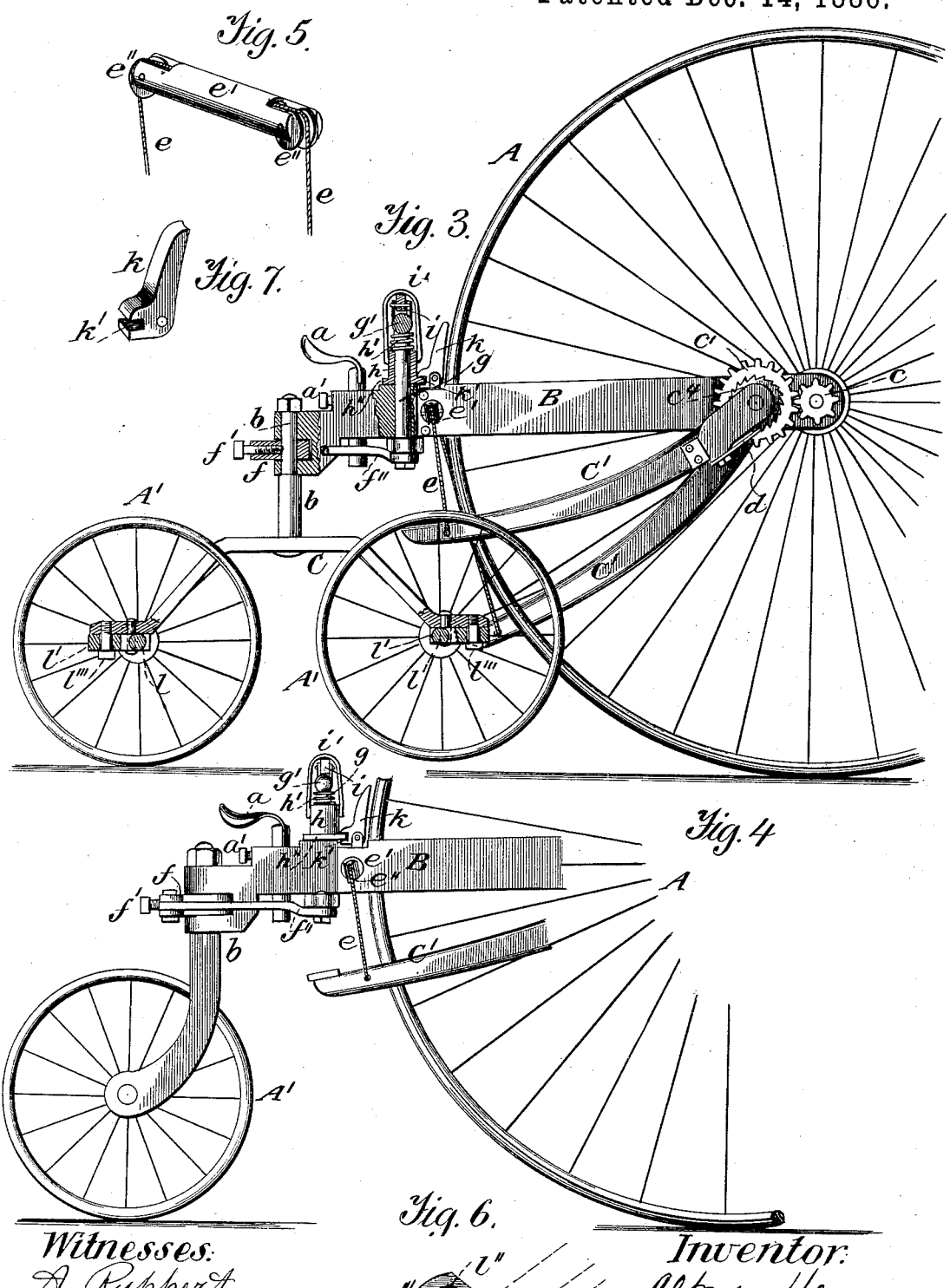

ALFONSO MERCER, OF BRAMBLETON, VIRGINIA.

TRICYCLE.

SPECIFICATION forming part of Letters Patent No. 354,337, dated December 14, 1886.

Application filed June 8, 1886. Serial No. 204,507. (No model.)

*To all whom it may concern:*

Be it known that I, ALFONSO MERCER, of Brambleton, in the county of Norfolk and State of Virginia, have invented certain new and useful Improvements in Wheeled Vehicles, of which the following is a specification, reference being had to the accompanying drawings, and to the letters of reference marked thereon.

This invention relates to a device which under one arrangement of its parts constitutes a tricycle and under another arrangement a bicycle, and which, when in the form of a tricycle, may be collapsed or closed when not in use or to be stowed away, so as to occupy no more space than the ordinary bicycle.

The invention also relates to improvements in the propelling, steering, and braking mechanisms, as hereinafter more particularly specified.

In the accompanying drawings, Figure 1 is a perspective view of my improved wheeled vehicle arranged as a tricycle. Fig. 2 is a plan view of the same. Fig. 3 is an elevation of the tricycle as collapsed or closed when not in use or when intended to be stowed away. Fig. 4 is an elevation of a part of the machine, showing it arranged as a bicycle. Figs. 5, 6, and 7 represent detached details, as hereinafter set forth.

Similar letters of reference indicate similar parts in the respective figures.

A is the main wheel of the vehicle.

A' A' are rear or supplemental wheels, which, as shown in Figs. 1, 2, and 3, are two in number. In Fig. 4 only one of such wheels is shown.

B is the frame or fork, which is bifurcated for the entrance of the main wheel A, and which at its rear end supports the saddle $a$ and the vertical pivot $b$ of the rear wheel or wheels, A'.

C is the axle of the pair of wheels A' A'. The axle of the main wheel A is provided at each end with a pinion, $c$, rigidly secured thereto, and which engages with a larger gear-wheel, $c'$, one of which is mounted at each side of the frame B on a stationary pin or stud, $c''$. The gears $c'$ are each provided with a collar, $c^3$, to which is rigidly secured a ratchet, $c^4$, the collar $c^3$ working loosely upon the stud $c''$.

The inner ends of the treadles C' are forked or bifurcated, as shown in Figs. 1 and 2, the outer half of the forked end working loosely upon the outer end of the stud $c''$, while the inner side of the fork works loosely upon the collar $c^3$ between the gear $c'$ and the ratchet-wheel $c^4$. Under each treadle is mounted a spring-pawl, $d$, which engages with the ratchet-wheel $c^4$. The outer or free ends of the treadles C' are connected by a cord or its equivalent, $e$, which passes through a pipe, $e'$, having at each end a sheave, $e''$, as shown in Fig. 5, which pipe passes transversely through the frame B just forward of the saddle $a$. The construction is such that as one treadle is depressed by a foot of the rider its descent will, through the medium of the cord $e$, cause the raising of the other treadle.

A bar, $f$, is secured to the vertical pivot $b$ of the rear wheel or wheels by means of a screw, $f'$, and to each end of said bar $f$ is pivoted a link, $f''$, the end of each link attaching to a bar, $f^3$, secured to the lower end of the steering-shaft $g$. The upper end of the shaft $g$ is provided with steering-handles $g'$. The steering-shaft $g$ is provided with a sliding collar, $h$, normally depressed by means of a spiral spring, $h'$, surrounding the shaft. A brake-lever, $i$, is pivoted to the steering-handles $g'$, and a link or strap, $i'$, attached to the sliding collar $h$, fits over the lever, so that on depressing the handle of the lever said collar $h$ will be raised against the force of the spring $h'$. The sliding collar $h$ is provided with a flange, $h''$, which fits within the groove $k'$ of the brake-shoe $k$, (shown in Fig. 7,) said brake shoe being pivoted to the frame B, as shown. Therefore on depressing the lever $i$ the brake-shoe is forced against the periphery of the main wheel in the usual manner.

The saddle $a$ is vertically adjustable, and may be secured at any given height by means of the screw $a'$.

Referring to Figs. 1, 2, 3, and 6, it will be seen that the rear wheels, A' A', are mounted upon axles or pins $l$, projecting from plates $l'$, which are pivoted to the axle C. Each plate $l'$ is provided with a circular slot, $l''$, through which a screw, $l^3$, passes into the outer end of the axle C.

When the vehicle is in use as a tricycle, the plates $l'$ are adjusted to the position shown in Fig. 1 and in full lines in Fig. 2, being secured by the screws $l^3$; but when it is desired to stow away the tricycle the plates are moved on their pivots to the position shown in Fig. 3 and in dotted lines in Fig. 2, when the axle C may be swung to a position nearly parallel to the longitudinal center line of the machine, as shown in Fig. 3.

When it is desired to use the machine as a bicycle, the axle C and its pivot are removed and the devices shown in Fig. 4 substituted, the steering devices hereinbefore described being applied to said parts.

I claim as my invention—

1. A tricycle adapted to be closed or collapsed when not in use, having a pivoted rear axle combined with wheels mounted adjustably on said axle, substantially as set forth.

2. The combination of the main wheel, frame, pivoted rear axle, and adjustable wheels, substantially as set forth.

3. The frame, pivoted rear axle, and wheels thereon, combined with plates having curved slots, and devices for securing said slotted plates to the said rear axle, substantially as set forth.

4. In a tricycle adapted to be converted into a bicycle by the substitution of a single rear wheel for the wheels and axle of the tricycle, the combination of the frame or fork B, vertical pivot $b$, bar $f$, links $f''$, bar $f^3$, shaft $g$, and steering-handles $g'$, substantially as set forth.

6. In a wheeled vehicle of the character herein described, the combination of a steering-post, a sleeve surrounding the same, a brake operated by said sleeve, and a link mechanism connecting said post with the pivot of the rear wheel or wheels, substantially as set forth.

In testimony whereof I hereunto set my hand and seal.

ALFONSO MERCER. [L. S.]

Witnesses:
GEORGE M. HOWARD,
E. HICKENLOOPER.